Patented July 21, 1936

2,048,632

UNITED STATES PATENT OFFICE 2,048,632

WRINKLE FINISH ENAMEL AND METHOD OF MAKING

Charles R. Bragdon, Cincinnati, Ohio, assignor to Ault & Wiborg Corporation, a corporation of Ohio No Drawing. Application March 30, 1931, Serial No. 526,559

2 Claims. (Cl. 134—26)

This invention relates to an enamel paint composition adapted when baked to provide a rough uneven finish having a wrinkled effect.

My investigation upon which this invention is predicated disclosed that raw China-wood oil has a natural tendency to dry with a flat frosted crystalline appearing surface. When ordinary rosin or colophony is combined with China-wood oil, the product has the property of drying with a lustrous smooth finish. The wrinkle finish is between this smooth finish and the crystalline finish.

Now, if the China wood oil be combined with a resin of low acid value, a satisfactory enamel results which dries with the desired wrinkled finish. There are many types of synthetic resins of low acid value, but for the purpose of this disclosure abietic acid almost completely neutralized with glycerine or a similar basic radical may be taken as examplary.

Specifically, one type of resin to be combined with China-wood oil to produce the wrinkle finish comprises approximately 8% of phenol formaldehyde resin and approximately 92% of the abietic acid glycerine compound. The important ingredients of the finished enamel are China-wood oil heated with a modifying resin of the nature described to a degree just sufficient to prevent the crystalline effect, a drying ingredient, and a low boiling point thinner of highly volatile character. In the case of the phenol formaldehyde, abietic acid and glycerine and resin, an additional drier is not necessary as the desired drying influence is provided by the resin itself.

As an example of a satisfactory enamel, approximately 200 pounds of the phenol formaldehyde abietic acid glycerine resin is heated with approximately 180 pounds of raw China-wood oil to about 580° F. and maintained at this temperature until the drip from the stirrer strings out about 3 inches. About twenty pounds of linseed oil is then added and the batch cooled quickly to 450° F. This temperature is maintained until the drip from the stirrer strings over 2 inches, after which the batch is cooled quickly to 200° F. and reduced with 10 gallons of V. M. & P. naphtha, 20 gallons toluol and 7½ gallons of high test gasoline. The desired pigments are then incorporated in the enamel, usually by grinding the pigment in ordinary spar varnish, and thoroughly combining the resulting paste with the base of the enamel.

When the enamel is used, the article is first coated, usually with a reasonably thick coat, after which it is baked for a period of an hour to an hour and a half at a temperature of about 200° F., at the end of which time the enamel will not only have hardened, but the surface will have become uneven to provide an ornamental wrinkled effect.

Having described the invention, I desire to be limited not by the example provided, but by the ensuing claims.

I claim:

1. In a method of manufacturing and improving a wrinkled finish paint composition, mixing a resin comprising a substantially small amount of a phenol formaldehyde resin and a relatively large amount of the ester resulting from the almost complete neutralization of abietic acid by glycerine, with raw China-wood oil, heating to approximately 580°, maintaining the mixture at this temperature until the drip from the stirrer strings out approximately three inches, adding a relatively small amount of linseed oil, cooling the batch quickly to approximately 450°, maintaining this temperature until the drip from the stirrer strings out approximately two inches, quickly cooling the batch to approximately 200° F. and adding reducer and pigments.

2. In a method of manufacturing and improving a wrinkled finish paint composition, mixing 200 pounds of a resin composed of 8% phenol formaldehyde resin and 92% of the ester resulting from the almost complete neutralization of abietic acid by glycerine with 180 pounds of raw China-wood oil, heating to approximately 580°, maintaining the mixture at this temperature until the drip from the stirrer strings out approximately three inches, adding a relatively small amount of linseed oil, cooling the batch quickly to approximately 450°, maintaining this temperature until the drip from the stirrer strings out approximately two inches, quickly cooling the batch to approximately 200° F. and adding reducer and pigments.

CHARLES R. BRAGDON.